Patented Aug. 27, 1929.

1,726,510

UNITED STATES PATENT OFFICE.

CHARLES N. CONE, GLENN DAVIDSON, AND IRVING F. LAUCKS, OF SEATTLE, WASHINGTON, ASSIGNORS TO I. F. LAUCKS INC., OF SEATTLE, WASHINGTON, A CORPORATION OF WASHINGTON.

PROCESS OF MAKING A WATER-RESISTANT ADHESIVE AND THE PRODUCT THEREOF.

No Drawing.  Application filed January 3, 1928. Serial No. 244,363.

Our invention relates to the process of making a water resistant adhesive and to the product thereof. More particularly our invention relates to additions of chemical compounds to dispersed vegetable proteins and to dispersed casein which additions have the effect of increasing the strength and the water resistance of the resultant adhesives.

Whenever the term "vegetable protein" is used herein, it is used to include such vegetable protein containing materials as soya beans, peanuts, cottonseed, linseed and other oil bearing seeds as whole seeds, or the residual cake or meal remaining after the oil is extracted or removed in whole or in part, or proteins derived therefrom. Wherever the terms vegetable protein flour, soya bean flour, peanut flour, cottonseed flour, linseed flour, etc. are used herein, they are used to include vegetable protein containing materials, soya beans, peanuts, etc. ground to flour as a whole; vegetable protein containing materials, soya beans, peanuts, etc., from which a portion or all of the oil has been extracted by pressure or other means, as ground soya bean cake or meal, ground cottonseed cake or meal, etc.; and also extracted vegetable protein, soya bean protein, peanut protein, cottonseed protein, etc. which is dried and ground to meal or flour; and extracted soya bean protein, peanut protein, etc. which may be used as a wet curd in direct mixing of an adhesive, (omitting the step of drying the protein, grinding to a flour, and mixing with water or other dispersing agent). That is, the terms, vegetable protein flour, soya bean flour, peanut flour, etc. as herein used include the extracted vegetable protein, soya bean protein, peanut protein, etc. respectively, and the protein in conjunction with the other natural components of the vegetable protein containing material, the other natural components of soya beans, of peanuts, etc. in whole or in part.

Wherever the term "casein" is used herein, it is used to include protein of milk whether such protein is in the form of wet curd or dried and ground, and also whether sulphuric acid, hydrochloric acid, lactic acid precipitated or natural sour casein.

By the term "dispersed condition", as applied to protein containing material, we mean the state attained in the transformation of a mealy or granular mass to a more or less smooth mass in the presence of a liquid, and to such extent as we thus refer to the degree of sub-division of particles we believe that we are using the term "dispersion" not inconsistently with the accepted usage of colloid chemists.

By "paraffin hydrocarbons" we mean to include the so-called straight chain hydrocarbons as distinguished from the cyclic hydrocarbons. When we say "halogen substitution products of paraffin hydrocarbons", we mean to include halogen substitution and addition products of paraffin hydrocarbons.

We have discovered that when halogen substitution products of the paraffin hydrocarbons are used in the manufacture or compounding of vegetable protein adhesives and casein adhesives, the resultant adhesives possess remarkable strength and water resistance.

To illustrate: When halogen substitution products of the paraffin hydrocarbons such as, for example, carbon tetrachloride, chloroform, ethylene dichloride, ethylene trichloride, acetylene trichloride, iodoform, etc. are used as additions in the manufacture of vegetable protein adhesives and casein adhesives, the strength and water resistance of the resultant adhesives are greatly increased over the strength and water resistance of the adhesives manufactured without such additions.

For example, in the manufacture of adhesives from vegetable portein containing materials we illustrate with a formula embodying soya bean flour which is a commercial formula for adhesive suitable for use in the manufacture of high grade plywood.

A dry powdered mixture of soya bean flour and other ingredients is made up first in proportion, for instance, of soya bean flour 1052 parts; calcium hydrate 189 parts; powdered rosin 56 parts; potassium permanganate 5 parts; and sodium fluoride 158 parts. These ingredients are thoroughly mixed and form a dry powdered vegetable protein containing adhesive ready to be mixed with water and applied in the manufacture of plywood.

In illustration of the effect of halogen substitution products of the paraffin hydrocarbons upon adhesives embodying vegetable protein containing material such as the one described above, we may use carbon tetrachloride.

We may designate the above described mixture of vegetable protein containing material and other dry powdered ingredients and also other similarly compounded dry mixtures as "powdered adhesive" in further describing our invention.

In further preparation of the adhesive for use in plywood the powdered adhesive is mixed with water in a suitable mixing device. The adhesive strength increasing and water resistance producing ingredient is added, the mixture is further mixed and is then ready for application to plywood. For example:—

A. Place 950 parts of water in suitable mixing device; add 415 parts of powdered adhesive, stir 25 minutes; and add 400 parts of water and stir five minutes. The adhesive is now ready for application to plywood or other material to be glued.

B. Same as A except add also 10 parts of carbon tetrachloride immediately before final stirring.

C. Same as A except add 10 parts chloroform immediately before final stirring.

The manufactured adhesives A and B were spread upon plywood using in one case fir and in another case birch. The dry joint strengths were obtained expressed in pounds tensile strength per square inch of joint surface. Also the joint strengths were obtained after test pieces had been soaked in water for forty-eight hours and expressed in the same terms as the dry joint strength.

All conditions of temperature, pressure, time of assembly of plywood were the same for all tests.

Results of tests were as follows:

|   | Dry strength using | | Strength after soaking 48 hours using | |
|---|---|---|---|---|
|   | Fir | Birch | Fir | Birch |
| A | 167 lbs. | 217 lbs. | 100 lbs. | 13 lbs. |
| B | 247 lbs. | 260 lbs. | 158 lbs. | 127 lbs. |
| C | 247 lbs. | 312 lbs. | 152 lbs. | 113 lbs. |

In each case it will be noted that not only is the dry adhesive strength increased in B and C over A, but the adhesive strength after soaking in water for forty-eight hours is very markedly increased.

Again, we may illustrate with an example of an adhesive made with a mixture of soya bean flour and casein as follows:

Soya bean flour, 150 parts; calcium hydrate, 50 parts; powdered rosin, 54 parts; and ground casein, 30 parts. These dry ingredients are thoroughly mixed in powder form and the mixture may be referred to as "powdered adhesive."

D. Place 500 parts of water in suitable mixing device. Add 284 parts of powdered adhesive and 30 parts of an 18% solution of caustic while stirring. Continue stirring for seven minutes. Add 90 parts of sodium silicate solution and 160 parts of water and stir sixteen minutes. Add 250 parts of water and stir five minutes. The adhesive is now ready for application to plywood or other material to be glued.

E. Same as "D" except that 82 parts of carbon tetrachloride were added before the caustic solution.

These manufactured adhesives "D" and "E" were then spread upon fir. The joint strengths after soaking forty-eight hours in water were determined. All conditions of temperature, pressure, time of assembly, etc. were the same in both cases.

|   | Strength after soaking in water forty-eight hours. |
|---|---|
| D | 70 |
| E | 105 |

The remarkable increase in water resistance (50%) resulting from the use of an halogen substitution product is apparent.

Another formula and set of examples will further illustrate the importance of our discovery:

Soya bean flour, 300 parts; calcium hydrate, 54 parts; sodium carbonate, 30 parts; and sodium fluoride, 22½ parts. These ingredients are thoroughly mixed in powdered form and the mix may be referred to as "powdered adhesive".

A "master wet mix" of adhesive may then be made up by placing 2400 parts of water in a suitable mixing device, adding 1626 parts of "powdered adhesive" while stirring. Continue stirring fifteen minutes and add 1600 parts of water and continue stirring until the master wet mix is homogenous. The adhesive is now ready for application to plywood or other material to be glued.

F. Master wet mix used as adhesive without further additions.

G. Two parts of carbon tetrachloride in 10 parts of water added to 280 parts of master wet mix and well stirred in.

H. One part of iodoform in 10 parts of water added to 280 parts of master wet mix and well stirred in.

These manufactured adhesives were spread upon fir plywood. The dry joint strengths and joint strengths after soaking in water forty-eight hours were obtained as in preceding examples.

Results of test were as follows:

|   | Dry strength | Strength after soaking forty-eight hours. |
|---|---|---|
| F | 180 | 105 |
| G | 292 | 138 |
| H | 200 | 115 |

The increased joint strengths, both dry and after soaking in water forty-eight hours, will be noted in "G" and "H", when halogen substitution and addition products of paraffin hydrocarbons are added to adhesives embodying proteins, over "F" in which no such addition is used.

These examples are illustrative of the advantageous results provided by our invention. We do not of course confine ourselves to proportions or formulæ cited above as we have found other combinations and proportions of halogen substitution products of paraffin hydrocarbons to have markedly beneficial effects when used in conjunction with the manufacture of vegetable protein and casein adhesives, using a wide variety of formulæ.

In further examplification of the scope of our invention we may cite examples of the increased strength and water resistance developed in adhesives adapted for sizing of cellulose fibre products.

In general, there are known to the art: first, engine size, i. e., where the adhesive forms a coating for every fibre, which sizing is added to the paper during the process of its manufacture; second, surface size, which constitutes a coating for the surface to produce paper, especially fine surface paper, as for high grade writing stationery; and, third, surface coat, i. e., a mixture of adhesive and pigment for fine half-tones and book paper and also for strengthening and waterproofing fabrics and paper. For example, it may be used in conjunction with talc, kaolin, whiting, blanc fixe, and the like to form coatings having a high gloss and water resistant properties and also it may be used with mineral oils, asphalt and fatty oils to produce coatings for fabrics and paper having elastic properties, flexibility, increased strength and great water resistance.

Our product may be used for all these various types of sizes, i. e., for engine size, surface size and for surface coating size, i. e., the adhesive (size) used to bind pigment to the surface of the paper in the manufacture of coated paper. In commercial practice, the term "size" is used interchangeably to designate the adhesive used in all of the above instances, and it is in this way that the term is used in this application.

For purposes of this disclosure we define the term "size" to include all uses given hereinabove. In short, we make no distinction between the terms "size" and "coating" so far as the applicability of our adhesive is concerned, and whenever the term "size" is used in this application it is expressly to be understood that it may also include (wheresoever the context permits) what is commercially known or referred to as "coatings."

Furthermore, our improved size may be used to impart the properties of stiffness and water resistance to cellulose, cotton or linen fabrics, as well as to increase their gloss or lustre; it also may be used to impart water resistance and at the same time maintain pliability, the stiffness or pliability being in the main regulated by the pigment chosen.

By "pigment" we mean, in this application, any material other than the protein adhesive bound to the cellulose fibre product including such materials as clay, kaolin, whiting, blanc fixe, and the like; asphalt, mineral and fatty oils, and rosin.

We have discovered that when halogen substitution products of paraffin hydrocarbons are added to dispersed vegetable protein flour, in the process of manufacture of size for cellulose fibre products, the adhesive strength of the size is very greatly increased and the water resistance of the size, and consequently of the cellulose fibre products embodying the size, are increased to a very remarkable extent.

The following examples will illustrate the extraordinary and remarkable results attained by us through the use of our discovery.

The test we use for evaluating the adhesive strength of a size when used in conjunction with a pigment in the manufacture of coated papers, for instance is a modified form of the "surface pick test" which is well known to the trade and described in the literature. The surface pick test consists in a test of the amount of the paper coating picked by a composition roller inked with a tacky ink. The test is made as a comparison between a standard piece of coated paper and the sample to be tested.

It is of very material advantage to be able to give to each sample a numerical value. This is accomplished by preparing a series of standards by making pick tests on pieces of coated papers containing varying amounts or proportions of adhesive or size, so that the results obtained range from very poor to practically perfect, that is, from a paper so poorly coated that a very large proportion of the coating is removed by the ink roller to a coated paper of such high standard that practically none of the coating is removed by the roller.

It is necessary, therefore, in order to use this standard, to give numerical values to results obtained and to most carefully control all the conditions under which the test is made, as for instance; the amount of ink carried on the roller, the pressure used on the roller, and the number of times the roller is carried over the test piece.

Similarly, the water resistance of such a cellulose fibre product as coated or surface sized paper is evaluated numerically by means of a test operated as follows:

The surface of a sample of coated paper is wetted and rubbed with a brush under standard conditions until the coating is removed. We have found a camel's hair brush with the bristles cut short is best for this purpose. The pressure on the brush and angle at which it contacts the paper and the length of the stroke are kept constant by a suitable mechanical device. One cubic centimeter of water is run onto the surface to be tested and rubbing started. The point at which the brush first begins to roll up the fibres of the paper, which occurs as soon as the coating or surface sizing is removed, is taken as the end point of this test. The number of strokes of the brush required to reach the end point is taken as the numerical value of the water resistance of the sample tested. Having thus outlined the method of testing the strength and water resistance used in the manufacture of cellulose fibre products and the strength and water resistance of cellulose fibre products embodying adhesives we may cite examples to show results obtained by the use of our invention.

In illustration of a cellulose fibre product embodying a vegetable protein adhesive we may coat paper with English coating clay and use soya bean flour as representative vegetable protein containing material, in the manufacture of the adhesive. The clay mix is made by mixing together 100 parts of English coating clay and 70 parts of water. This is allowed to stand at least twenty-four hours before use. Adhesive mix may be made by mixing 100 parts of soya bean flour with 450 parts of water in a suitable device, 50 parts of ten percent solution of caustic soda is added, and 5 parts of "the adhesive strength increasing and increased water resistance producing ingredient" is added, the mixture is further agitated and then heated on a water bath to 150° F. and then cooled. The clay mix and adhesive mix are then mixed in suitable proportions and are ready for application to the paper.

The test results given below, in exemplification of the material benefits to be derived as a result of our discovery, using the same procedure as to methods of tests, formula for clay mix, adhesive mix, coating mix, etc. except that the "adhesive strength increasing and increased water resistance producing ingredient" was varied, are as follows:

Test A-1. No "adhesive strength increasing and increased water resistance producing ingredient" was added.

Test A-2. An halogen substitution product of paraffin hydrocarbon, namely carbon tetrachloride, was added in the proportion of five parts.

Test A-3. An halogen substitution product of paraffin hydrocarbon, namely chloroform, was added in the proportion of four parts.

Test A-4. An halogen substitution product of paraffin hydrocarbon, namely trichlor-ethylene, was added in the proportion of four parts.

*Results.*

|  | Strength | Water resistance |
|---|---|---|
| A-1 | 18 | 45 |
| A-2 | 34 | 110 |
| A-3 | 32 | 154 |
| A-4 | 32 | 101 |

The remarkable increase in strength and water resistance due to the embodiment of halogen substitution products of paraffin hydrocarbons is apparent.

Other examples of vegetable protein containing materials used in the manufacture of adhesives with which halogen substitution products of the paraffin hydrocarbons may be used with very advantageous results, as our experiments have shown, are peanut flour, cottonseed flour, linseed flour, etc.

To further illustrate the importance of our discovery when applied to adhesives embodying the casein of milk, which adhesives are adapted for sizing of cellulose fibre products, we may cite a formula using casein and give results of a few of the tests which we have made.

An adhesive mix may be made up by soaking 100 parts of casein in 440 parts of water for one hour, adding 6 parts of caustic soda in 60 parts of water and adding 5 parts of "increased water resistance producing ingredient", the further manipulation being similar to that outlined in example of vegetable flour adhesive mix above described.

The test results given below resulted from the same procedure as to method of tests, formula for clay mix, adhesive mix, coating mix, etc., except that the "increased water resistance producing ingredient" was varied.

Test D-1. No "increased water resistance producing ingredient" was added.

Test D-2. An halogen substitution product of paraffin hydrocarbon, namely carbon tetrachloride, was added in the proportion of five parts.

Test D-3. Five parts of chloroform were added.

*Results.*

|  | Water resistance |
|---|---|
| D-1 | 192 |
| D-2 | 482 |
| D-3 | 400 |

The notable increase in water resistance of the coating embodying the adhesives containing halogen substitution products of paraffin hydrocabons, as shown in D-2 and D-3 as compared to D-1, is clearly indicated.

We claim:

1. A method of making adhesives which comprises adding an halogen substitution product of the paraffin hydrocarbons to dispersed vegetable protein containing material.

2. A method of making adhesives which comprises adding an halogen substitution product of the paraffin hydrocarbons to dispersed soya bean protein containing material.

3. A method of making adhesives which comprises adding carbon tetrachloride to dispersed vegetable protein containing material.

4. A method of making adhesives which comprises adding carbon tetrachloride to dispersed soya bean protein containing material.

5. In the manufacture of an adhesive embodying vegetable protein dispersed in an alkaline medium, the step of adding an halogen substitution product of the paraffin hydrocarbons.

6. In the manufacture of an adhesive embodying soya bean protein dispersed in an alkaline medium, the step of adding an halogen substitution product of the paraffin hydrocarbons.

7. An adhesive which embodies vegetable protein containing material and an halogen substitution product of the paraffin hydrocarbons.

8. An adhesive which embodies soya bean protein containing material and an halogen substitution product of the paraffin hydrocarbons.

9. An adhesive which embodies vegetable protein containing material in a dispersed condition and carbon tetrachloride.

10. An adhesive which embodies soya bean protein containing material in a dispersed condition and carbon tetrachloride.

11. An adhesive which embodies the reaction products of vegetable protein containing material and an halogen substitution product of paraffin hydrocarbons.

12. An adhesive which embodies the reaction products of soya bean protein containing material and an halogen substitution product of paraffin hydrocarbons.

13. An adhesive which embodies the reaction products of vegetable protein containing material in a dispersed condition and carbon tetrachloride.

14. An adhesive which embodies the reaction products of soya bean protein containing material in a dispersed condition and carbon tetrachloride.

15. An adhesive which embodies the reaction products of protein containing material in a dispersed condition and carbon tetrachloride.

In witness whereof, we hereunto subscribe our names:

This 8th day of December, 1927.
    CHARLES N. CONE.
This 15th day of December, 1927.
    GLENN DAVIDSON.
This 8th day of December, 1927.
    IRVING F. LAUCKS.